United States Patent [19]

Shyu

[11] Patent Number: 4,823,916
[45] Date of Patent: Apr. 25, 1989

[54] ROLLER-TYPE BICYCLE BRAKE STRUCTURE

[76] Inventor: Yeong-Ji Shyu, No. 99, Jen Yi Street, San Chung City, Taiwan

[21] Appl. No.: 91,194

[22] Filed: Aug. 31, 1987

[51] Int. Cl.$^4$ .......................... B62L 1/02; B62L 5/10; F16D 69/02
[52] U.S. Cl. .................. 188/24.12; 188/25; 188/251 A
[58] Field of Search ............. 188/2 D, 17, 24.11, 188/24.12, 24.21, 25, 80, 39, 262, 251 R, 251 A; 192/107 M

[56] References Cited

U.S. PATENT DOCUMENTS

| 665,306 | 1/1901 | Boyd | 188/25 |
| 1,501,589 | 7/1924 | Ferris | 188/25 X |
| 3,767,018 | 10/1973 | Gordon | 188/250 G |
| 4,189,424 | 2/1980 | Takamatsu | 524/264 X |

FOREIGN PATENT DOCUMENTS

| 0458012 | 10/1913 | France | 188/24.21 |
| 0011841 | of 1908 | United Kingdom | 188/24.11 |

OTHER PUBLICATIONS

Patent Gazette of Republilc of China, Dated Oct. 1, 1983: Nos. 53,680; 53,681; 41,134.

Primary Examiner—Robert J. Oberleitner
Attorney, Agent, or Firm—Bacon & Thomas

[57] ABSTRACT

The present invention relates to an improved clamping brake structure for a bicycle having dual roller brake elements. The elements may be made of natural or synthetic rubber. The roller-brake elements are attached to a cornered base iron structure, respectively and the brake structure is preferably mounted on the front wheel of a bicycle.

7 Claims, 1 Drawing Sheet

U.S. Patent    Apr. 25, 1989    4,823,916
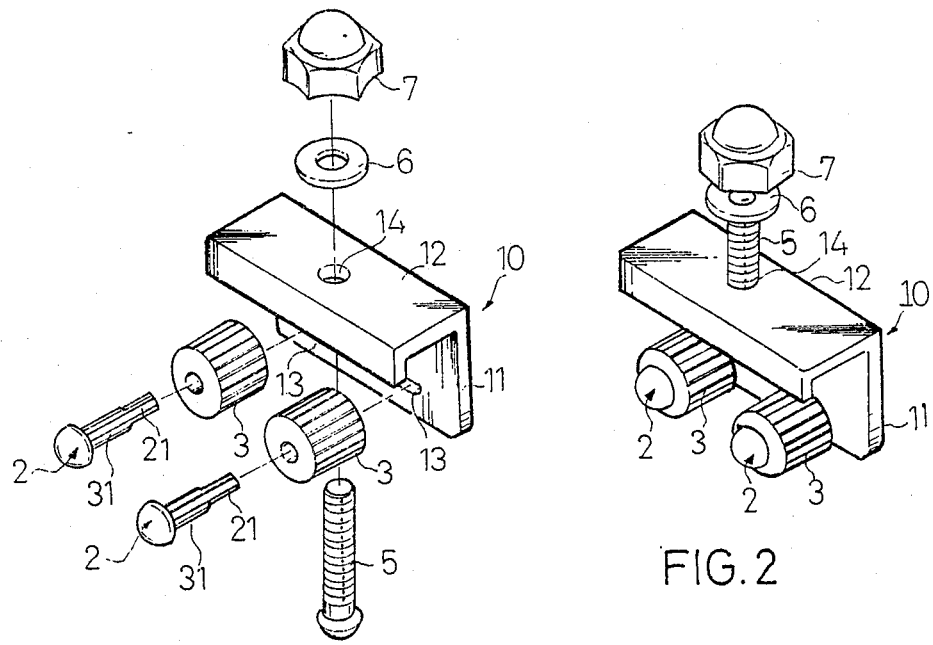
FIG.1
FIG.2
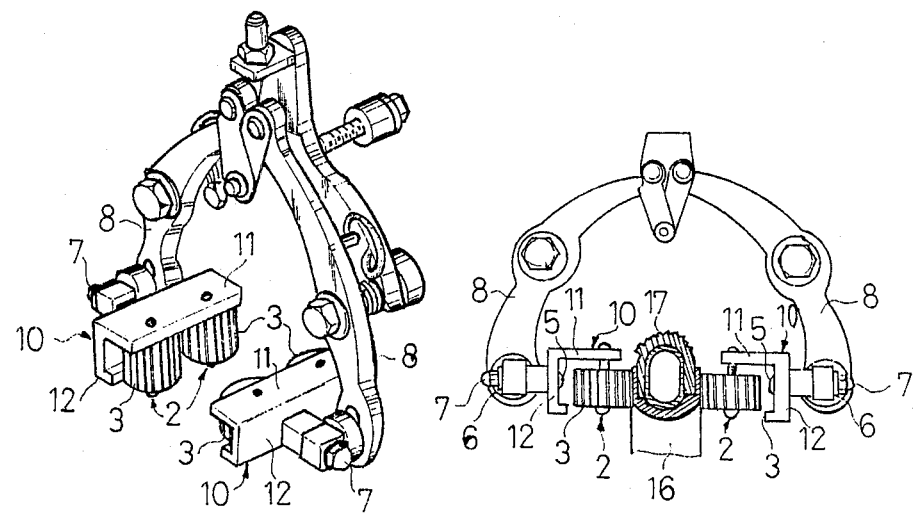
FIG.3
FIG.4

4,823,916

ROLLER-TYPE BICYCLE BRAKE STRUCTURE

BACKGROUND OF THE INVENTION

The present invention relates to a brake structure for use on a bicycle, which consists of a corner base iron with two oval mortises, and cylindrical dual roller brake elements made of natural or synthetic rubber rotatably fixed onto it by two rivets. This structure incorporates a tenon and mortise joint. By incorporating the dual roller, the brake will make the riding of bicycle more secure. Some further refined properties of the rubber material such as heat resistance and weathering proofness makes this apparatus more practical and economical. However, in order to prevent the bicycle from skidding under sudden braking, it is recommended this brake be installed on a front wheel.

Today, many people enjoy riding a bicycle for entertainment and outdoor exercise. For increased safety, those people desire to equip their bicycles with a more secure and effective brake means. It has been well known that the conventional brake structures have used a rubber block member mounted on the clamping brake. Using a rubber block member is not an ideal way, since it is likely to malfunction. Under wet conditions or when suddenly applying the brake, the rubber block generally causes the rear wheel to lock-up and slip with respect to the surface. In pursuit of a safe design of the brake system, the dual roller structure in a clamping brake was disclosed to improve the braking capacity. Several rubber schemes disclosed in the patent gazette of R.O.C. as followed are listed for references:

(1) "Brake Block", Ser. No. 7,120,394, U.S. Pat. No. 53681, R.O.C.

(2) "Aluminium Alloy As a Brake Block of Bicycle", Ser. No. 7,021,439, U.S. Pat. No. 41134, R.O.C.

(3) "Block Rubber for the Clamper", Ser. No. 7,122,144, U.S. Pat. No. 53680, R.O.C.

These cited inventions describe some different new ideas on the rubber structure of the clamping brake, but they all have a rubber block which is substantially different in comparison with the present dual roller design.

SUMMARY OF THE INVENTION

The major object of this invention is to provide a dual roller brake structure on a bicycle clamping brake, which is constructed by fastening two rubber rollers on a base iron with two axial rivets, to increase the braking capacity, even in case of rainy or high temperature situations.

Another object of this invention is to provide a dual roller design for a bicycle clamping brake mentioned above, which is preferably mounted on the front brake of the bicycle instead of a rear one, for preventing the wheel from a slipping movement so as to avoid accidents during emergency braking conditions.

BRIEF DESCRIPTION OF THE DRAWINGS

In order to make a more detailed description of the present roller type brake structure, several figures associated with necessary explanations are presented as follows:

FIG. 1 is an exploded perspective view showing the components of the present invention;

FIG. 2 is a perspective view of a brake according to the invention;

FIG. 3 is a perspective view of a clamping brake incorporating the roller brake according to the invention; and, FIG. 4 is a front view, partially in cross-section of a clamping brake incorporating the roller brake according to the invention.

DETAILED DESCRIPTION OF THE PREFERRED EMBODIMENT

Referring to FIGS. 1 and 2, the present brake structure includes a corner base iron 10 made of an angled bar. On one side 11 of the base iron, there are located two small ovel holes 13 which form two tenon and mortise joints in conjunction with the rivets 2. Rivet 2 has a tenon portion 21. Before the tenon 21 is pegged into the oval hole 13, its extends through cylinder roller 3 and a washer (not shown). The roller is made up of sulfurated rubber with hardness about 85 to 95 IRHD and a good heat resistent quality. After the roller 3 and the washer are located, the tenon 21 of the rivet 2 extends through the oval hole 13 of the base iron 10 and a welding joint is formed between the tenon 21 and the back side wall 11 of the base iron. In order to make the roller free of unnecessary rotation, the tenon 21 and the oval hole 13 must have an elliptic shape instead of a round one. However, another hole 14, which may have a round shape is located on the other side wall 12 of the base iron and is used to attach this brake roller onto the brake arm 8 as illustrated in FIG. 3 by bolt 5, washer 6 and screw nut 7.

Since the external construction of the rubber forms a cylindrical dual roller 3, the friction loss is very small such that the bicycle may be prevented from slipping during sudden application of the brake, which has been a major shortcoming of the conventional brake structure. The brake structure as shown in FIG. 4 will provide a short braking distance and does not instantly stop the bike wheel while suddenly applying the brake, thus preventing accidents from happening.

The said roller 3 is attached, but not fixed on the base iron 10 by the rivet 2 and may slightly rotate when the rollers are in pressing abutment with the steel rim 16 of the wheel having tire 17 mounted thereon and the tangent surfaces of the rollers are heavily pressed during braking. The said roller rubber with a diameter of 14 to 16 millimeter and a thickness of 4 to 6 millimeters has less friction loss than the conventional rubber block. Furthermore, there exists an axle 31 associated with the rivet 2 on the central portion extending through said roller 3 to fix the roller firmly on the base iron 10. Without said axle 31, the position of the said roller 3 will be distorted, if the rivet 2 is excessively pegged toward the side wall 11. Therefore, the provision of the axle 31 becomes important and necessary.

I claim:

1. A roller-type brake for a bicycle having a wheel with a rim portion and a brake arm comprising:

(a) a base iron comprising a corner iron having a first side wall defining a pair of generally parallel oval holes and a second side wall extending from the first side wall at an approximate right angle, the second side wall defining an opening;

(b) a pair of rubber, generally cylindrical roller brake elements;

(c) attaching means extending through the oval holes to attach the roller brake elements to the first side wall; wherein the attaching means comprises a headed rivet having a portion extending through a roller brake element and a tenon portion extending through an oval hole to form a mortise and tenon joint; and, (d) mounting means mounting the second side wall to the brake arm such that, during braking, the roller brake elements are pressed against the rim portion of the wheel, the attaching means allowing slight rotation of the roller brake elements to prevent wheel lock-up and consequent sliding of the wheel, the mounting means comprising a bolt extending through the opening and attached to the brake arm by a nut.

2. The roller-type brake according to claim 1 wherein the roller brake elements comprise a rubber material having a hardness ranging from 85 to 95 IRHD.

3. The roller-type brake according to claim 2 wherein the rubber material is natural rubber.

4. The roller-type brake according to claim 2 wherein the rubber material is a synthetic rubber.

5. The roller-type brake according to claim 2 wherein the rubber material is a sulfurated rubber compound.

6. The roller-type brake according to claim 5 wherein the rubber material forming the roller brake elements has a thickness of at least 4 millimeters.

7. The roller-type brake according to claim 2 wherein the rubber material forming the roller brake elements has a thickness of at least 4 millimeters.

* * * * *